United States Patent [19]

Gerber et al.

[11] 4,185,962
[45] Jan. 29, 1980

[54] DYEING WITH ORGANIC DYESTUFFS DISPERSED IN AN ORGANIC LIQUID

[75] Inventors: Hans Gerber, Allschwil; Erwin Grueninger, Basel; Werner Koch, Oberwil; Franz Somm, Riehen, all of Switzerland

[73] Assignee: Sandoz Ltd., Basel, Switzerland

[21] Appl. No.: 545,333

[22] Filed: Jan. 30, 1975

Related U.S. Application Data

[63] Continuation of Ser. No. 263,955, Jun. 19, 1972, abandoned, which is a continuation-in-part of Ser. No. 240,276, Mar. 31, 1972, abandoned, Ser. No. 226,705, Feb. 16, 1972, abandoned, and Ser. No. 110,314, Jan. 27, 1971, abandoned.

[30] Foreign Application Priority Data

| Feb. 2, 1970 [CH] | Switzerland | 1422/70 |
| Apr. 30, 1970 [CH] | Switzerland | 6519/70 |
| Feb. 18, 1971 [CH] | Switzerland | 2398/71 |
| Apr. 7, 1971 [CH] | Switzerland | 5059/71 |

[51] Int. Cl.² ............................................. D06P 5/04
[52] U.S. Cl. ............................................. 8/171; 8/94 A; 8/172 R; 8/173; 8/174
[58] Field of Search ................... 8/62, 173, 172, 171

[56] References Cited

U.S. PATENT DOCUMENTS

| 2,259,225 | 10/1941 | Kienle | 8/62 |
| 2,275,991 | 3/1942 | Powers | 8/62 |
| 2,524,811 | 10/1950 | Koberlein | 8/166 X |
| 2,594,899 | 4/1952 | Fordemwalt | 8/62 |
| 3,199,942 | 10/1965 | Kuth et al. | 8/93 |
| 3,510,243 | 5/1970 | Seuret | 8/174 X |
| 3,666,397 | 5/1972 | Datye | 8/171 |

OTHER PUBLICATIONS

Apps, "Inks for the Minor Printing Process & Other Specialized Applications", pp. 94–96, Pub. by Leonard Hill, London, 1963.
Ellis, Printing Ink, pp. 350–358, 84–88, 249 & 280–281, Rheinhold Pub.
Fortess et al., Amer. Dyestuff. Rep., May 27, 1963, 402–411.
Introduction to Textile Printing, pp. 5 & 6, Pub. 1964 by Butterworths, Ltd.
Silverman, Amer. Dyestuff Rep., Jan. 26, 1948, pp. 44–46 & 62.

*Primary Examiner*—Donald Levy
*Attorney, Agent, or Firm*—Gerald D. Sharkin; Richard E. Vila; Thomas C. Doyle

[57] ABSTRACT

A dyeing or printing process for substrates consisting of synthetic or semi-synthetic, high molecular organic substances of hydrophobic character, performed with an organic dyestuff which is dispersed in a liquid organic compound containing a dissolved alkyd resin acting as a dispersing agent.

12 Claims, No Drawings

DYEING WITH ORGANIC DYESTUFFS DISPERSED IN AN ORGANIC LIQUID

This application is a continuation of our copending application Ser. No. 263,955, filed June 19, 1972, and now abandoned, which, in turn, was a continuation-in-part of applications Ser. No. 110,314, filed Jan. 27, 1971; Ser. No. 226,705, filed Feb. 16, 1972; and Ser. No. 240,276, filed Mar. 31, 1972 which are now abandoned.

It has been found that exhaust dyeings, pad dyeings and prints of high quality can be produced on filaments, fibres, yarns and piece goods, i.e. woven, nonwoven or knitted fabrics consisting of synthetic or semi-synthetic organic substances of high molecular weight and hydrophobic character, by impregnating, i.e. exhaust dyeing, padding or printing the substrates with a liquor consisting essentially of a liquid organic compound, an organic dyestuff, which is dispersed therein and an alkyd resin dissolved in the organic liquid, and fixing the impregnations.

It is essential that the dye liquor or the printing paste, respectively, is free, or at least substantially free of water.

By "synthetic organic substances" are understood primarily linear aromatic polyesters, polyamides, e.g. the polyamides 6, 7, 11, 66, 76, 226, 610 and 6.66, polyacrylonitrile and acrylonitrile copolymers, and polyolefins, e.g. polypropylene. By "semi-synthetic organic substances" is meant artificially modified cellulosic fibers, e.g. secondary cellulose acetate and cellulose triacetate. These substances may be present in blends with each other or with fibres of different type, e.g. cellulosic fibres. Also basic modified organic fibres, e.g. basic modified polypropylene, polyacrylonitrile and acrylonitrile copolymers, can be dyed by the new process.

The organic dyes may be freely chosen from those commonly used for the substrate in question, e.g. dyes free from sulphonic acid groups (the so-called "disperse dyes", see e.g. the "Colour Index", Second Edition, 1956, vol. 1, pp. 1655 to 1742); can be selected for synthetic and semi-synthetic substrates, e.g. of linear organic polyesters, cellulose 2½- or triacetate and synthetic polyamides; premetallized (the 2:1 chromium or cobalt complex dyes are particularly valuable) or unmetallized dyes containing sulphonic acid and/or carboxylic acid groups and/or reactive groups for synthetic polyamide fibres and basic modified organic fibres; basic dyes are chosen for the dyeing of polyacrylonitrile and acrylonitrile copolymer fibres, etc. The information in the "Colour Index" (Second Edition, 1956) apply.

Reactive dyes used in the process are primarily those whose molecule contains at least one group of formula

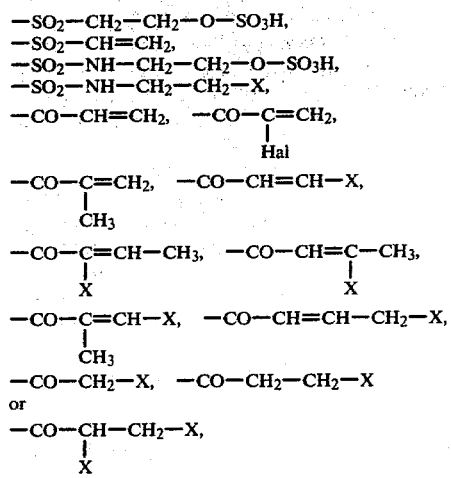

where
Hal stands for fluorine, chlorine or bromine,
Y for hydrogen, fluorine or chlorine, and
Z for an unsubstituted or substituted amino group or an alkoxy group.

Other reactive dyes of special interest are compounds bearing one or more substituents of formula $-SO_2-CH_2-CH_2-O-SO_3H$,
$-SO_2-CH=CH_2$,
$-SO_2-NH-CH_2-CH_2-O-SO_3H$,
$-SO_2-NH-CH_2-CH_2-X$,
$-CO-CH=CH_2$, $-CO-\underset{Hal}{\overset{|}{C}}=CH_2$,
$-CO-\underset{CH_3}{\overset{|}{C}}=CH_2$, $-CO-CH=CH-X$,
$-CO-\underset{X}{\overset{|}{C}}=CH-CH_3$, $-CO-CH=\underset{X}{\overset{|}{C}}-CH_3$,
$-CO-\underset{CH_3}{\overset{|}{C}}=CH-X$, $-CO-CH=CH-CH_2-X$,
$-CO-CH_2-X$, $-CO-CH_2-CH_2-X$
or
$-CO-\underset{X}{\overset{|}{CH}}-CH_2-X$, where X stands for chlorine or bromine.

These dyes may contain carboxylic acid and/or sulphonic acid groups and may be metallized. They are well known in the art and in general use.

Organic liquid compounds are preferred in which the dyes are not significantly soluble at room temperature, i.e. to less than 5 g/l, preferably less than 2 g/l. Their boiling range should be between about 80° C. and 170° C. Examples of organic liquid compounds meeting these requirements are saturated aliphatic hydrocarbons, aromatic hydrocarbons and unsaturated hydrocarbons (2,2,5-trimethylhexane, xylene, vinyl benzene), higher alcohols (cyclohexanol, iso-butyl carbinol and trimethylene glycol), higher ethers (iso-amyl ether, ethoxy toluene, furan, 1,1-diethoxyethane), compounds of high boiling point having one or more carbonyl groups (butanone, acetophenone), acids (propionic acid), esters of high boiling point (propyl acetate, butyl formate), halogenated hydrocarbons (chlorobenzenes, tetrachlorethane, trichlorethylene, tetrachlorethylene, trichlorotrifluorethane), which are preferred, compounds containing one or more nitrogen atoms (nitroethane, acetonitrile, methacrylonitrile, dimethyl formamide, triethylamine, pyridine), compounds containing sulphur or metal (thiophene, thiodiethylene glycol) and compounds containing a combination of the aforenamed elements or groups. Especially preferred organic liquids are perchlorethylene and trichlorethylene.

The dispersions are produced by grinding the dyes and the liquid organic compounds in which the alkyd resins are dissolved. Grinding is generally carried out in ball or sand mills, the suitable machines being well known to the technologist in this field. The mixture is ground until the major proportion of the dye particles is about 0.01 to 10 microns, or, preferably, 0.1 to 5 microns, in size.

In the present process the alkyd resins act solely as dispersing agents. It is not possible to prepare dispersions of the dyes in the organic liquid compounds in the absence of any alkyd resin as the dyes are precipitated at once under these conditions.

The mixtures for grinding contain preferably up to 30 weight percent of dye. The resulting dispersions are stable for long periods of time and at high temperatures. They are normally diluted with further organic liquid to a content of about 0.01 to 4 weight percent of pure dye before application to the textile substrate.

The alkyd resins necessary for the production of stable dispersions are described, for example, in "Encyclopedia of Polymer Science and Technology" (London, 1964), Vol. 1, pp. 663-734. These alkyd resins are oligomeric polyesters from organic polyhydroxy compounds with, in the main, multibasic acids. The acid number is kept small, i.e. below about 25, by using an excess of polyalcohol. Examples of suitable polyalcohols are glycerin, pentaerythrite, trimethylol propane and trimethylol ethane. Examples of suitable acids are orthophthalic, isophthalic and terephthalic acid or other aromatic dicarboxylic acids and, in a mixture with the mentioned aromatic dicarboxylic acids, certain saturated dicarboxylic acids. Most of these alkyd resins contain triglycerides in the form of non-drying vegetable oils, in which case, because of their high viscosity, they are often employed in solution in xylene. Rapid drying oils with an iodine number greater than about 100, e.g. alkyd resins containing linseed oil, produce an undesirable finish effect on the substrate and therefore are not claimed.

Examples of suitable oils are coconut, peanut, castor and sperm oil.

It is of course advantageous to employ the dyes in the pure state, i.e. free from standardizing agents, which are beneficial only for dyeing and printing from aqueous medium. Often this permits the otherwise necessary washing off and rinsing of the dyed or printed goods to be omitted.

The alkyd resin is generally used in amounts of 0.05 to 5 parts or preferably from 0.2 to 2 parts by weight per 1 part by weight of the dye. Greater amounts of alkyd resin do not offer any colouristic advantages.

In the production of the dispersions it can be of advantage to add up to 5% by weight of the dye further agents, for example alkylene oxide adducts, in particular those of the general formula

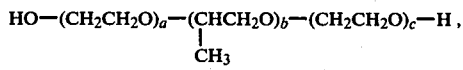

where a represents a whole number from 5 to 50, b a whole number from 2 to 50 and c a whole number from 5 to 50, and whose molecular weight is in the range of about 500 to 5000.

Thickening agents which may be used for the application of the dye dispersions in printing processes include ethyl cellulose and hydrophobic substances such as pyrogenic, finely divided silicic acids with a specific surface area between 80 and 400 m² per gram.

Dyeing is carried out at long or short liquor ratio. For dyeing at long liquor ratios generally less than 10 grams of pure dye free from standardizing material per liter of the dyebath are used, and for dyeing at short liquor ratios up to 40 grams per liter.

In exhaust dyeing from long baths the substrate, which may, if desired, be pretreated according to methods known in the art, is entered into the dyebath at the dyeing temperature or at room temperature. If the bath is at room temperature it is brought to the dyeing temperature in accordance with a predetermined programme as in exhaust dyeing from aqueous dispersion or solution. Fixation invariably takes place in the dyeing liquor, in the course of the dyeing process, which is generally of 10 minutes to 2 hours' duration. In general, cellulose 2½-acetate is dyed at temperatures from 40° to 80° C., the other substrates may be dyed at temperatures up to 170° C., preferably in the range of 80° to 145° C. High dyeing temperatures are preferable owing to the higher rates of exhaustion and fixation thereby achieved, using pressure dyeing machines, if available.

Short baths are usually employed on continous dyeing ranges. The substrate, normally loose fibre, yarn or fabric, is conveyed through the liquor on a short passage of 10 seconds to 5 minutes and the dyeing then fixed in superheated or saturated steam or in dry heat in a steamer or chamber. The fixation time is about 30 seconds to 5 minutes depending on the chamber temperature.

The steam may be the vapour of the organic liquid in the dyebath, another suitable solvent vapour, or water vapour. Fixation can be carried out at excess pressure if desired.

It can be of advantage to set the dyebath with small amounts (about 2 to 20 parts per 1000 parts of solvent) of a neutral, inert acid derivative, e.g. amide, in particular an amide derived from a carboxylic acid having 1 to 3 carbon atoms, such as dimethyl formamide, dimethyl acetamide or phosphoric tri-(dimethylamide).

In the dyeing of polyester/cotton blends it can be of advantage to include in the as far as possible water-free dyeliquor a dissolving assistant for the residual amount of water, for example a 1:1 mixture of a calcium alkylaryl sulphonate and a water soluble polyglycol ether.

Suitable calcium alkylaryl sulphonates include, for example, calcium alkyl benzene sulphonates with about 10 to 15 carbon atoms in the alkyl radical (calcium decyl, calcium dodecyl and calcium pentadecyl benzene sulphonate), calcium monoalkyl and calcium dialkyl naphthalene sulphonates with about 8 to 10 carbon atoms in the alkyl radical or radicals (calcium dibutyl and calcium nonyl naphthalene sulphonates). Examples of suitable water soluble polyglycol ethers are the adduct of about 7 to 20 mols of ethylene oxide on saturated or unsatureated fatty alcohols having about 10 to 18 carbon atoms (lauryl heptaglycol and lauryl octylglycol ethers, oleyl pentadecaglycol ether) or on monoalkyl or dialkyl phenols having about 8 to 12 carbon atoms in the radical or radicals (iso-octyl phenyl and nonyl phenyl decaglycol ethers, di-isoamyl phenyl dodecaglycol ether, dodecyl phenyl dodecaglycol ether).

In dyeing with reactive dyes containing reactive halogen, hydrogen halide is liberated. If it is necessary to bind this acid to prevent damage to the fibre, the dyebath, as stated, can be set with an acid amide or an amine soluble in the organic liquid compound used.

For pad application of the dispersions, machines which are resistant to solvents are preferable. After padding, the organic liquid is generally removed from the substrate by evaporation in an enclosed, heated condensation chamber. The dyeings and prints are fixed by one of the standard methods such as heat treatment in steam, solvent vapour or dry air, i.e. at temperatures ranging from 100° to 230° C.

After fixation the dyeings or prints are preferably treated with the same solvent as that in the dye dispersion, in order to remove unfixed dye and the alkyd resin remaining on the fibre.

The dyeings obtained by the process of this invention are in no way inferior in the fastness properties or in brilliance to dyeings produced by conventional methods. In many cases the levelness is better. In comparison with dyeing methods from aqueous solution or dispersion, the present process has the following advantages: as no water is used there is no contamination of the works effluent; there are savings in power consumption as the heat of evaporation of organic liquids is lower than that of water; less time is needed as a rule for dyeing and fixation.

In comparison with dyeing methods using water-in-oil or oil-in-water emulsions, the process of the invention has the advantage that the organic liquids are easy to recover. Since it is not usually necessary to use mixtures of solvents, simple distillation yields the pure solvent.

In the following Examples the parts and percentages are by weight and the temperatures in degrees centigrade.

EXAMPLE 1

One part of the dye of formula

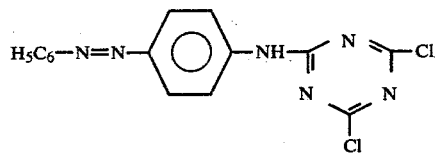

is mixed with 4 parts of perchloroethylene and 1 part of a mixture of 45 parts of alkyd resin, 27.3 parts of ethyl glycol acetate and 27.3 parts of ethyl acetate. The mixture is ground in a ball mill to a fine dispersion, to which 10 parts of perchloroethylene are added. The alkyd resin used is a phthalic glycerin ester containing 43.5% of phthalic anhydride and 33% coconut oil. Its acid number is between 6 and 10.

A padding liquor is set with 3 parts of this dispersion, 15 parts of a 7% solution of ethyl cellulose in perchlorethylene, 1 part of dimethyl acetamide and 80 parts of perchlorethylene. A nylon 6 filament fabric is padded with this liquor at room temperature and at an expression giving a 70% increase on the dry weight, dried at a temperature of 120° and the dyeing fixed in dry heat for 1 minute at 210°. The fabric is washed off in perchlorethylene, dried, rinsed with water and dried. A level yellow dyeing is obtained which has excellent fastness properties.

Very similar dyeing results are obtained when in place of the aforestated alkyd resin of 33% coconut oil content, one containing 76% glycerin phthalate and 24% peanut oil, or 82% glycerin phthalate and 18% castor oil, of 69% pentaerythrite phthalate and 31% coconut oil is used.

In place of the dye of the above formula, the dyes of the following constitution can be used:

2-methyl-4-(2'-chloro-4'-methylaminotriazinyl-6'-amino)-4"-chloro-1,1"-azeobenzene (yellow), 4-(2',4',5'-trichloropyrimidyl-6'-amino)-3"-methoxynaphthyl-1,1'-azonaphthalene (red), 4-(2',4'-difluoro-5'-chloropyrimidyl-6'-N-methylamino)-2"-methyl-4"-chloro-1,1"-azobenzene (yellow), 1-(2',4'-dichlorpyrimidyl-5'-carbonylamino)-3-methoxy-4-dimethylaminoanthraquinone (violet), 1-(benzothiazolyl-2-mercapto)-5-vinylcarbonylaminoanthraquinone (blue), 1-(3'-methyl-4'-chloroacetylaminophenylazo)-4-hydroxynaphthalene (reddish yellow), 1-(naphthyl-2'-azo)-2-methyl-4-(3"-vinylsulphonylbenzoylamino)-benzene (orange), 4-(2"-methylsulphonyl-4"-chloro-5"-methylpyrimidyl-6-amino)-3'-methoxy-1,1'-azobenzene (yellow),

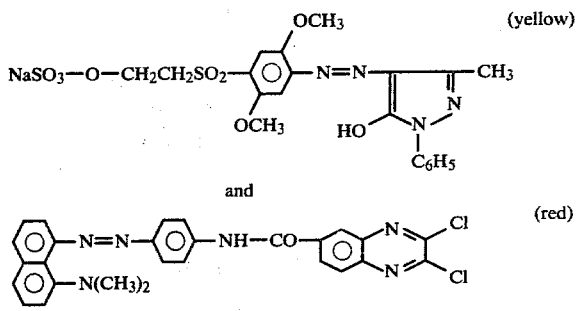

and

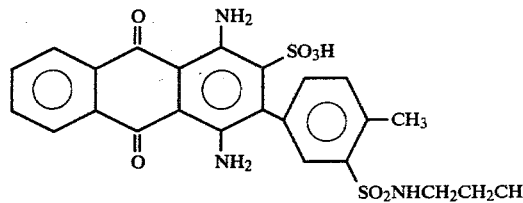

EXAMPLE 2

One part of the dye of formula

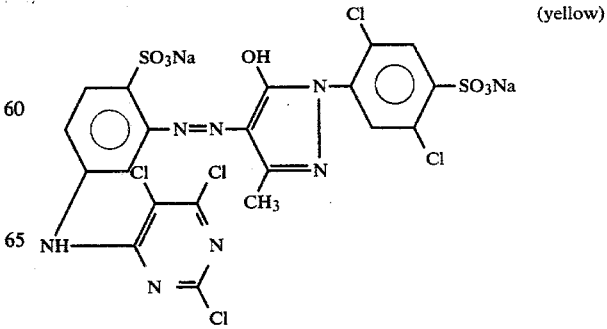

is mixed in 2 parts of perchlorethylene with 1 part of a mixture of 50 parts of alkyd resin (68% glycerin phthalate, 32% coconut oil content) and 50 parts of xylene. The mixture is ground to a fine dispersion in a sand mill and mixed with 6 parts of perchlorethylene.

A nylon 6 taffeta fabric is padded at room temperature with a liquor consisting of 5 parts of this dispersion and 95 parts of perchlorethylene, expressed to a 70% increase on the dry weight, dried at 120° and fixed in dry heat for 1 minute at 210°. The fabric is then rinsed with perchlorethylene to remove the alkyd resin, rinsed and dried. After final washing off as normal in practice, a blue dyeing with excellent light, washing and rubbing fastness is obtained.

In place of the aforestated alkyd resin, the alkyd resins named in the first Example can be used, with which practically the same results are obtained.

The procedure of Example 2 is also suitable for applying the following dyes:

-continued
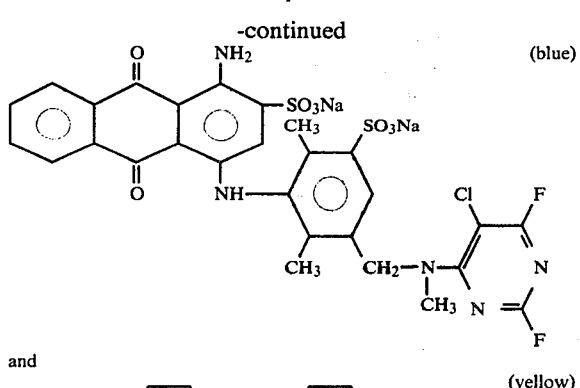 (blue)
and
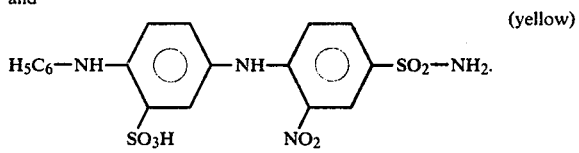 (yellow)
The dyes of the following formulae can also be applied in accordance with the procedure of Example 2, with the difference that the dyeings, after intermediate drying at 120°, are fixed in superheated steam for 1 minute at about 180°.
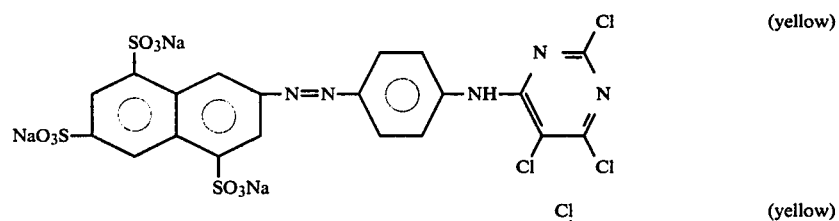 (yellow)
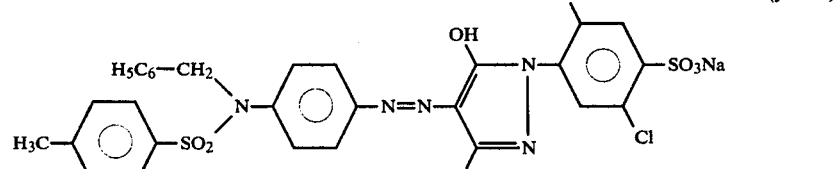 (yellow)
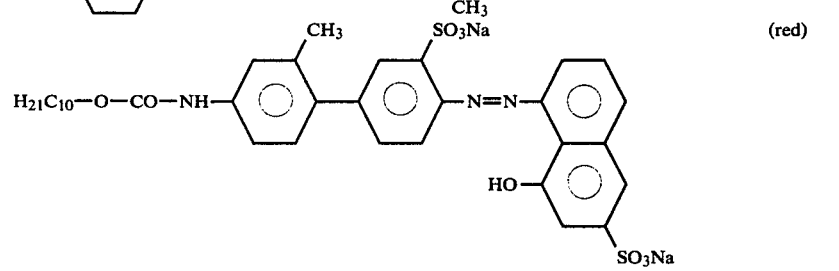 (red)
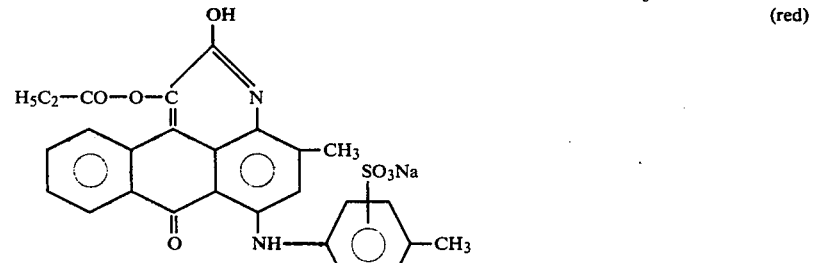 (red)
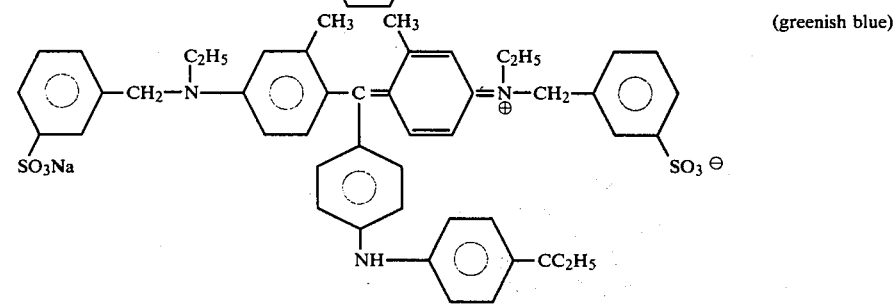 (greenish blue)

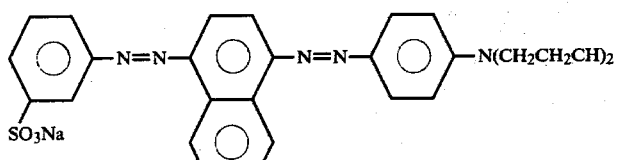
(bluish red)

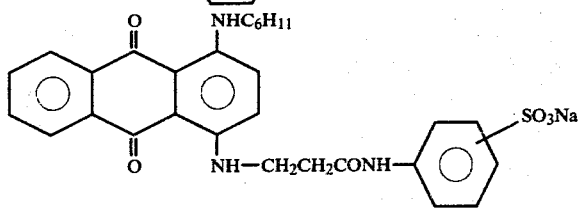
(blue)

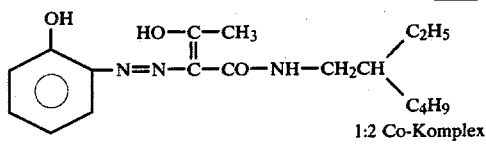
1:2 Co-Komplex
(yellow)

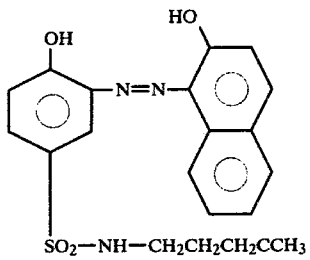
1:2 Co-Komplex
(bordeaux)

and

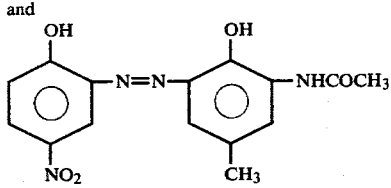
1:2 Cr-Komplex

EXAMPLE 3

One part of the dye of formula 1-amino-2-sulphonic-acid-4-(3'-β-hydroxyethyl-amino-sulphonyl-4'-methyl-phenylamino)-anthraquinone, 4 parts of perchlorethylene and 1 part of a mixture of 50 parts of alkyd resin (68% glycerolphthalate, 32% coconut oil) and 50 parts of xylene are mixed and the mixture ground in a sand mill until a fine dispersion is formed. Subsequently 14 parts of perchlorethylene are added. The acid number of the alkyd resin used is between 6 and 10.

10 Parts of a spun nylon 66 fabric are dyed for 45 minutes at 120° in a bath of 250 parts containing 32 g/l of the dispersion prepared as described above, the remainder of the bath being perchlorethylene.

The fabric is rinsed with hot perchlorethylene, which clears it completely of the alkyd resin. A level dyeing of brillant blue shade is obtained which has fastness properties in no way inferior to those of a comparable dyeing from an aqueous dispersion of the dye.

When the foregoing is repeated substituting the following alkyd resins for the one specified above, equally good results are obtained (a) 76% glycerol phthalate, 24% peanut oil, (b) 82% glycerol phthalate, 18% castor oil,
(c) 69% pentaerytrolphthalate, 31% coconut oil.

EXAMPLE 4

A textured nylon 6-fabric is dyed for 10 minutes at 120° with a dispersion of the dye of formula

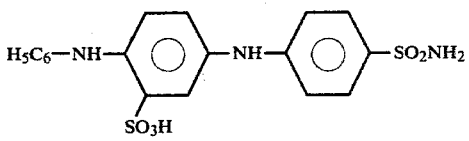

as described in Example 3. The level yellow-brown dyeing has the full fastness properties of the dye used.

EXAMPLE 5

A polyester fabric is conveyed in 10 seconds through a dispersion prepared as given in Example 3 and containing 1.2% of the pure dye of formula

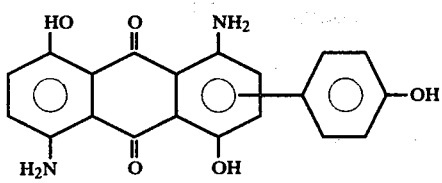

In the stated immersion time the fabric adsorbs 200% of its dry weight of the dispersion. It is conveyed further into a chamber filled with perchlorethylene vapour heated to 130°, where the dyeing is fixed in 2 minutes. The fabric is rinsed in hot perchlorethylene and dried.

It is dyed in a brilliant level blue shade with excellent fastness properties.

EXAMPLE 6

0.6 Parts of a mixture of equal parts of the pure dyes of formula

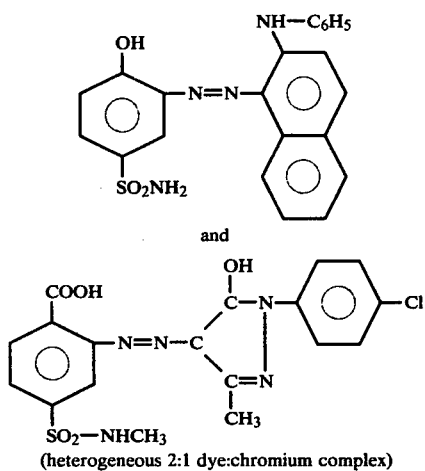

(heterogeneous 2:1 dye:chromium complex)

are mixed with 4 parts of perchlorethylene and 2 parts of a mixture of equal parts of alkyd resin (68% phthalate content, 32% coconut oil, acid number about 7) and xylene. The mixture is ground in a sand mill to form a fine dispersion. The dispersion is washed with perchlorethylene and its volume made up to 1000 parts with perchlorethylene.

At 25° 50 parts of a fabric made of crimped nylon 6 yarn are entered into this disperse dyebath, then the temperature is raised to 120° in about 45 minutes and dyeing continued at this temperature for 90 minutes with circulation. On removal the fabric is rinsed with hot perchlorethylene. An olive-green dyeing of impeccable quality is obtained.

EXAMPLE 7

A mixture of 2 parts of the pure dye of formula

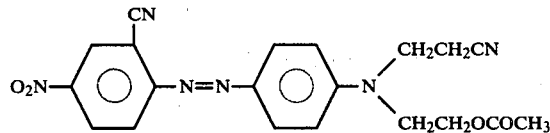

5 parts of the alkyd resin specified in Example 3 and 10 parts of perchlorethylene is ground in a sand mill to give a fine dispersion. After washing with perchlorethylene the dispersion is made up to 1000 parts with perchlorethylene.

100 Parts of textured polyester fabric are entered into the dispersion at 25°, the temperature is increased to 120° in 40 minutes and dyeing continued at this temperature for 60 minutes. After rinsing in hot perchlorethylene and drying, a brilliant red dyeing meeting the highest quality requirements is obtained.

In place of the alkyd resin produced with phthalic acid and coconut oil, an alkyd resin from phthalic acid and peanut oil can be employed with the same success.

EXAMPLE 8

One part of the dye 2,6-dichloro-4-nitro-4'-(N-β-cyanoethyl-N-β-acetoxyethylamino)-1,1'-azobenzene is mixed with 1 part of a mixture of 45 parts of alkyd resin, 27.3 parts of ethyl glycol acetate and 27.7 parts of ethyl acetate in 4 parts of perchlorethylene. The mixture is ground in a ball mill and the fine dispersion obtained is mixed with 10 parts of perchlorethylene. The alkyd resin used is a phthalic acid-glycerine ester containing 43.5% phthalic anhydride and 33% coconut oil and having an acid number between 6 and 10.

A padding liquor is prepared with 3 parts of the dispersion thus obtained, 15 parts of a 7% solution of ethyl cellulose in perchlorethylene, 1 part of dimethyl acetamide and 81 parts of perchlorethylene. A polyester fabric is padded with the liquor at an expression giving a 60% increase on the dry weight, dried at 70° and treated in dry air for 1 minute at 210° for fixation of the dyeing. The fabric is then rinsed with perchlorethylene, dried, soaped at 70° with a 0.2% aqueous solution of an alkyl- or alkylarylpolyglycol ether, rinsed with distilled water and dried. A level yellow-brown dyeing is obtained which has excellent fastness to washing and rubbing.

In place of the aforestated dye, 1 part of the 2:1 chromium complex of a 1:1 mixture of the dyes 1-(2'-hydroxy-4'-nitrophenylazo)-2-hydroxynaphthalene and 1-(2'-hydroxy-5'-nitrophenylazo)-2-hydroxynaphthalene can be applied to a fabric of nylon 66 fibre using the same procedure as given above. A deep black dyeing with excellent fastness properties is obtained.

EXAMPLE 9

One part of the dye 1-amino-2-phenoxy-4-hydroxyanthraquinone and 1 part of a mixture of 50 parts of alkyd resin of 68% phthalate and 32% coconut oil content and 50 parts of xylene are mixed in 4 parts of perchlorethylene. The mixture is ground to a fine dispersion in a sand mill, and the dispersion mixed with 10 parts of perchlorethylene. The acid number of the alkyd resin is between 6 and 10.

A padding liquor is prepared with 3 parts of this dispersion, 15 parts of a 7% solution of ethyl cellulose in perchlorethylene and 82 parts of perchlorethylene. It is padded on a fabric woven with warp and weft yarns spun with intimately blended polyester and cotton fibres in the ratio 67:33, and the fabric expressed to retain 70% of its weight of the liquor. It is then dreed at 120°, and the dyeing fixed for 1 minute at 210° in a dry air atmosphere. This is followed by a standard reduction clearing treatment, thorough rinsing and drying. A dyeing of deep red shades is obtained on the polyester component while the cotton component is left white; the dyeing has excellent wash and rubbing fastness.

In place of the aforenamed dyes, equal amounts of the following dyes can be employed:

1-phenylamino-2-nitro-4-phenylaminosulphonylbenzene (pale yellow), 4-(4''-hydrophenyl)-azo-1,1'-azobenzene (yellow), 2-cyano-4-nitro-4'-(N-β-cyanethyl-N-β-acetoxyethylamino)-1,1'-azobenzene (red), 2-chloro-4-nitro-4'-(N-ethyl-N-β-cyanethylamino)-1,1'-azobenzene (red), 1-methylamino-4-β-hydroxyethylaminoanthraquinone (blue), 2-bromo-4-nitro-4'-N-β-cyanethyl-N-β-hydroxyethylamino-1,1'-azobenzene (scarlet red) or 1,4-bis-(1'-hydroxybutyl-2'-amino)-anthraquinone (blue) or the dye of formula

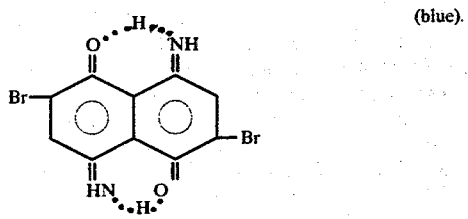

(blue).

EXAMPLE 10

In accordance with the procedure of Example 8, 1 part of the 2:1 chromium complex of the dye of formula

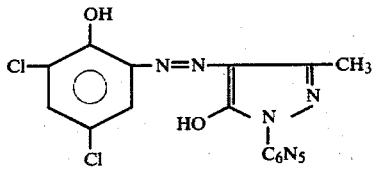

is ground in a sand mill to a fine dispersion which is freed from sand by filtration and washing with 10 parts of perchlorethylene.

Four parts of the dispersion are mixed with 15 parts of a 7% solution of ethyl cellulose in perchloroethylene, 1 part of dimethyl acetamide and 80 parts of perchorethylene. A nylon filament fabric is padded with this liquor and expressed to retain 60% of its weight of liquor, after which it is dried at 70° and the dyeing fixed in dry air for 1 minute at 200°. The fabric is soaped and rinsed as given in Example 1. The procedure results in a level red dyeing without the slightest barriness.

EXAMPLE 11

0.5 Part of the 2:1 cobalt complex and 0.5 part of the 2:1 chromium complex of the dye of formula

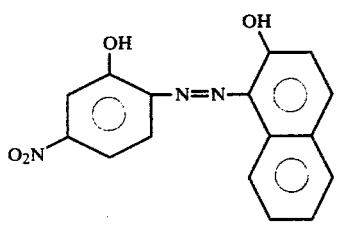

are dispersed as described in Example 8 and a padding liquor is prepared with the dispersion as given in Example 3. A nylon carpet is padded with the liquor, expressed, dried, fixed for 2 minutes in a current of dry air at 205° and treated further as given in Example 1. A level, fully penetrated blue-grey dyeing is obtained. The dye yield is 100%.

EXAMPLE 12

One part of a mixture of 50% of the dye of formula

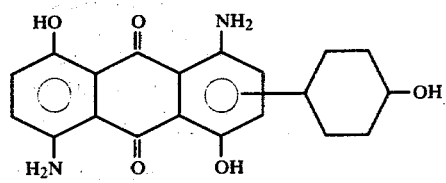

and 50% of the dye of formula

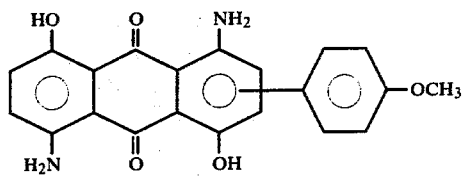

is mixed with 1 part of a mixture of 50 parts of alkyd resin containing 49% synthetic fatty acids (the remainder phthalate) and 50 parts of xylene in 4 parts of perchlorethylene. The mixture is ground to a fine dispersion in a sand mill and 10 parts of perchlorethylene are added.

A padding liquor is prepared with 3 parts of the dispersion thus obtained, 15 parts of a 7% solution of ethyl cellulose in perchlorethylene, 1 part of a 1:1 mixture of calcium dodecylbenzenesulphonate and iso-octyl-phenyldecaglycol ether, and 81 parts of perchlorethylene. It is padded on a fabric woven with warp and weft yarns spun with intimately blended polyester and cotton fibres in the ratio 67:33, with an expression giving a 70% increase on the dry weight. After drying at 120° the dyeing is fixed for 1 minute at 210° in dry air and reduction cleared. The polyester component is dyed in a deep blue shade of excellent fastness while the cotton component is reserved white.

In place of the aforemamed dye mixture 1 part of one of the following dyes can be used:

2,6-dichlor-4-nitro-4'-(N-β-cyanethyl-N-β-acetoxyethylamino)-1,1'-azobenzene (yellow-brown), 2-chloro-4-methylsulphonyl-2'-acetylamino-4'-diethylamino-1,1'-azobenzene (red), 2-cyano-4-nitro-4'-(N-β-cyanethyl-N-β-acetoxyethylamino)-1,1'-azobenzene (red) or the dye of formula

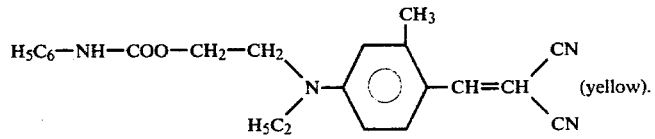

(yellow).

Having thus disclosed the invention, what we claim is:

1. In a process wherein a substrate comprising fibers of a high molecular weight, hydrophobic synthetic organic or artificially modified cellulosic material or a blend thereof is dyed by impregnating the material to be dyed with a liquor containing a dyestuff suitable for dyeing said material and fixing the dyestuff on the material, the improvement which comprises employing as the dye liquor a stable dispersion which is substantially free of water and consists essentially of
   (x) a dyestuff suitable for dyeing the material to be dyed, dispersed in
   (y) an organic liquid in which the dyestuff is not significantly soluble at room temperature and which has a boiling point in the range of about 80° to 170° C., and
   (z) an alkyd resin dissolved in the organic liquid and having an acid number below 25 and free from rapid drying oils having an iodine number greater than 100,
said component (x) being present in an amount of about 0.01 to 4 weight percent of said liquor and said component (z) being present in an amount of 0.05 to 5 parts per part of component (x) and, after fixation of the dye, removing any unfixed dye and any alkyd resin remaining on the material.

2. A process according to claim 1, wherein an amide of an alkanoic acid with 1 to 3 carbon atoms or phosphoric acid tris-(dimethylamide) is added to the dyeing dispersion.

3. A process according to claim 1 wherein the material to be dyed is selected from the group consisting of linear aromatic polyesters, polyamides, homopolymers and copolymers of acrylonitrile, polypropylene, cellulose acetate, cellulose triacetate and blends thereof.

4. A process according to claim 1 wherein the material is padded with the dye liquor and the fixation of the dyestuff is effected by treatment at a temperature of 100° to 230° C. in dry air, steam or solvent vapor.

5. A process according to claim 1 wherein component (y) is an organic liquid in which component (x) is soluble to an extent of less than 2 grams per liter.

6. A process according to claim 1 wherein the major proportion of component (x) is in the form of 0.01 to 10 micron particles.

7. A process according to claim 1 wherein the dye liquor contains less than 10 grams of dyestuff per liter.

8. A process according to claim 1, wherein component (z) contains a non-drying vegetable oil.

9. A process according to claim 1, which comprises exhaust dyeing or pad dyeing a material selected from the group consisting of linear aromatic polyester, polyamides, homopolymers and copolymers of acrylonitrile, polypropylene, cellulose acetate, cellulose triacetate and blends of said materials with a stable, substantially water-free dispersion consisting essentially of
   (x) a dyestuff which is suitable for dyeing the material to be dyed and which is selected from the group consisting of disperse dyes, premetallized dyes, acid dyes, reactive dyes, and basic dyes and the major proportion of which is in the form of 0.01 to 10 micron particles, dispersed in
   (y) an organic liquid in which the dyestuff is soluble to an extent of less than 2 grams per liter and which has a boiling point in the rage of about 80° to 170° C., and
   (z) an alkyd resin dissolved in the organic liquid and having an acid number below 25 and free from rapid drying oils having an iodine number greater than 100,
said component (x) being present in an amount of about 0.01 to 4 weight percent of the dispersion and said component (z) being present in an amount of 0.2 to 2 parts by weight per part of component (x).

10. A process to claim 9, wherein component (y) is a halogenated hydrocarbon.

11. A process according to claim 9 wherein the dye liquor contains less than 10 grams of dyestuff per liter.

12. A process according to claim 10 wherein component (y) is perchlorethylene or trichloroethylene.

* * * * *